US012645208B2

(12) United States Patent
Heesche et al.

(10) Patent No.: US 12,645,208 B2
(45) Date of Patent: Jun. 2, 2026

(54) METHOD AND SYSTEM FOR CONTROLLING A PRODUCTION PLANT TO MANUFACTURE A PRODUCT

(71) Applicant: Siemens Industry Software NV, Leuven (BE)

(72) Inventors: Kai Heesche, Munich (DE); Stefan Depeweg, Munich (DE); Markus Kaiser, Cambridge (GB)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 1070 days.

(21) Appl. No.: 17/691,190

(22) Filed: Mar. 10, 2022

(65) Prior Publication Data

US 2022/0299984 A1 Sep. 22, 2022

(30) Foreign Application Priority Data

Mar. 18, 2021 (EP) .................................... 21163510

(51) Int. Cl.
*G06N 20/00* (2019.01)
*G05B 19/418* (2006.01)
(Continued)

(52) U.S. Cl.
CPC ... *G05B 19/41885* (2013.01); *G05B 19/4183* (2013.01); *G06F 30/20* (2020.01);
(Continued)

(58) Field of Classification Search
CPC ....................................................... G06F 30/27
See application file for complete search history.

(56) References Cited

U.S. PATENT DOCUMENTS 8,352,226 B2 * 1/2013 Cullick ................... E21B 49/00
                                                     703/10
2007/0192309 A1 8/2007 Fischer et al.
(Continued)

FOREIGN PATENT DOCUMENTS

CN 111598170 A 8/2020
EP 3722894 A1 10/2020
(Continued)

OTHER PUBLICATIONS

Santos et al, "A Machine Learning Approach to Reduce the Number of Simulations for Long-Term Well Control Optimization", Oct. 19, 2020, Society of Petroleum Engineers Annual Technical Conference and Exhibition, p. 1 (Year: 2020).*
(Continued)

*Primary Examiner* — Rehana Perveen
(74) *Attorney, Agent, or Firm* — Schmeiser, Olsen & Watts LLP

(57) ABSTRACT

A machine learning module is provided which is trained to generate from a design data record specifying a design variant of a product, a first performance signal quantifying a predictive performance of the design variant and a predictive uncertainty of the predictive performance. A variety of design data records each specifying a design variant of the product is generated. For a respective design data record, the following steps are performed: a first performance signal and a corresponding predictive uncertainty are generated, depending on the predictive uncertainty, a simulation yielding a second performance signal quantifying a simulated performance of the corresponding design variant is either run or skipped, and a performance value is derived from the second performance signal if the simulation is run or, otherwise, from the first performance signal. Depending on the derived performance values, a performance-optimizing
(Continued)

design data record is determined and output to control the production plant.

12 Claims, 2 Drawing Sheets

(51) Int. Cl.
| | |
|---|---|
| *G06F 30/20* | (2020.01) |
| *G06F 30/27* | (2020.01) |
| *G06F 119/02* | (2020.01) |

(52) U.S. Cl.
CPC ............. *G06F 30/27* (2020.01); *G06N 20/00* (2019.01); *G06F 2119/02* (2020.01)

(56) References Cited

U.S. PATENT DOCUMENTS

| | | | | |
|---|---|---|---|---|
| 2016/0061008 A1* | 3/2016 | Al-Turki | .................. | G06F 30/20 703/10 |
| 2017/0146690 A1* | 5/2017 | Lee | ......................... | G01V 20/00 |
| 2019/0325108 A1 | 10/2019 | Turek et al. | | |
| 2020/0326718 A1 | 10/2020 | Kandemir et al. | | |
| 2020/0401113 A1* | 12/2020 | Yuan | ................ | G05B 19/41865 |

FOREIGN PATENT DOCUMENTS

| | | | | | |
|---|---|---|---|---|---|
| WO | WO-2020160898 A1 * | 8/2020 | ............. | B21B 38/04 |
| WO | WO-2020229234 A1 * | 11/2020 | ....... | G05B 19/41865 |

OTHER PUBLICATIONS

Li, Mingyang et al: "Surrogate model uncertainty quantification for reliability-based design optimization"; Reliability Engineering and System Safety; vol. 192, Mar. 23, 2019 (Mar. 23, 2019), pp. 1-12, XP085933630; DOI: 10.1016/J.RESS.2019.03.039.

Westermann, Paul et al: "Using Bayesian deep learning approaches for uncertainty-aware building energy surrogate models", Energy and AI; vol. 3, Mar. 1, 2021, p. 100039, XP055837739; DOI: 10.1016/j.egyai.2020.100039.

Gao, Zhengqi et al: "Efficient Performance Trade-off Modeling for Analog Circuit based on Bayesian Neural Network"; Proceedings of the IEEE/ACM International Conference on Computeraided Design; Nov. 4, 2019, pp. 1-8, XP033678236; DOI: 10.1109/ICCAD45719.2019.8942174.

"Pattern Recognition and Machine Learning" von Christopher M. Bishop, Springer 2011.

Wang Jun et al:; "Analysis of Uncertainty of Modal Parameters Identification based on Bayesian Method"; Jul. 8, 2016.

Contal, Emile et al. "Parallel Gaussian Process Optimization with Upper Confidence Bound and Pure Exploration"; Sep. 2013; https://arxiv.org/abs/1304.5350.

* cited by examiner

METHOD AND SYSTEM FOR CONTROLLING A PRODUCTION PLANT TO MANUFACTURE A PRODUCT

CROSS-REFERENCE TO RELATED APPLICATIONS

This application claims priority to EP Application No. 21163510.7, having a filing date of Mar. 18, 2021, the entire contents of which are hereby incorporated by reference.

FIELD OF TECHNOLOGY

The following relates to a method and system for controlling a production plant to manufacture a product.

BACKGROUND

Nowadays, the production of complex products like e.g. robots, motors, turbines, turbine blades, combustion engines, machining tools, vehicles, or their components often relies on sophisticated design systems. Such design systems usually provide design data which specify the product to be manufactured in detail. By such design data a modern production plant can be specifically controlled to manufacture the specified product.

In order to optimize a performance of a product with regard to given objectives or constraints, it is often aspired to automatically optimize the design data for the product. Such a performance may pertain to a power, a yield, a speed, a running time, a precision, an error rate, a resource consumption, an efficiency, a pollutant emission, a stability, a wear, a lifetime and/or other target parameters of the product. For the purpose of optimizing the performance, some design systems use so-called multi-dimensional optimization (MDO) tools. These tools usually simulate design variants of a product as specified by various design data and look for those design data which optimize the simulated performance of the product.

Such simulations, however, often consume a high amount of computational resources to determine the performance for each design variant. To reduce the computing demand, so-called surrogate models, e.g. based on machine learning, may be used to predict the outcome of a simulation. Such surrogate models, however, often have a poor accuracy.

SUMMARY

An aspect relates to provide a method and a system for controlling a production plant to manufacture a product, that allow for a more efficient design optimization.

According to embodiments of the invention, a machine learning module is provided which is trained to generate from a design data record specifying a design variant of a product, a first performance signal quantifying a predictive performance of the design variant and a predictive uncertainty of the predictive performance. Here and in the following, a component or subproduct of a composite product may also be considered as a product. Furthermore, a variety of design data records each specifying a design variant of the product is generated. For a respective design data record, the following steps are performed:
- a first performance signal and a corresponding predictive uncertainty are generated by the machine learning module,
- depending on the predictive uncertainty, a simulation of the corresponding design variant is either run or skipped, the simulation yielding a second performance signal quantifying a simulated performance of that design variant, and
- a performance value is derived from the second performance signal if the simulation is run or, otherwise, from the first performance signal. Depending on the derived performance values, a performance-optimizing design data record is determined from the variety of design data records. The performance-optimizing design data record is then output for controlling the production plant.

For performing the inventive method, a system, a computer program product (non-transitory computer readable storage medium having instructions, which when executed by a processor, perform actions), and a non-transient computer readable storage medium are provided.

The inventive method and/or the inventive system may be implemented by means of one or more processors, computers, application specific integrated circuits (ASIC), digital signal processors (DSP), programmable logic controllers (PLC), and/or field-programmable gate arrays (FPGA).

Embodiments of the invention allow to skip particular expensive simulations in cases where a prediction of the machine learning module is likely to be accurate. In this way, the number of simulations and, therefore, a computational effort may be reduced considerably without significantly impairing an optimization accuracy.

According to a preferred embodiment of the invention, the machine learning module may comprise or implement a surrogate model, a Bayesian machine learning model, a Bayesian neural network and/or a Gaussian process model. For the preceding models, many efficient learning methods are known which allow to train the models to generate predictions together with their corresponding uncertainties in a consistent and/or uniform way.

According to an advantageous embodiment of the invention, the training of the machine learning module may be continued by using the second performance signals as training data. With the second performance signals, the training of the machine learning module may be refined or updated by accurate simulation results.

According to a further embodiment of the invention, the predictive and/or simulated performance of a design variant may depend on a fulfillment of one or more design objectives by the design variant and/or on a compliance of the design variant with one or more design constraints. Such objectives may pertain to a power, an efficiency, a speed, a precision, a resource consumption, a stability, a wear and/or a lifetime of the product. For e.g. a turbine an objective may relate to a flow efficiency, a temperature efficiency and/or a cooling efficiency of the turbine or its components. Constraints may pertain e.g. to temperature limits, pressure limits, speed limits and/or other limits. A respective objective or constraint may be specified by configuration data for configuring the simulation and/or the training of the machine learning module.

According to a further embodiment of the invention, the predictive uncertainty may be represented by a probability distribution, a discrete probability distribution, a statistical variance, a statistical standard deviation, a confidence interval, and/or an error interval. Such a probability distribution may be considered as a distribution of plausible predictions. In particular, a probability distribution may be represented by a mean and a standard deviation (or variance) of that distribution.

According to a further embodiment of the invention, a decision whether to run or to skip a respective simulation may depend on a comparison of a corresponding predictive uncertainty with a threshold value. The respective simulation may be run if the threshold value is exceeded. In this way, an uncertain prediction may be replaced by a more accurate simulation result.

According to a further preferred embodiment of the invention, a decision whether to run or to skip a respective simulation may take the corresponding first performance signal into account. As the product design is optimized with regard to its performance, a higher uncertainty may be more acceptable in cases of lower predictive performance than in cases of higher predictive performance. In this way, the number of simulations may be further reduced.

According to a further preferred embodiment of the invention, a decision whether to run or to skip a respective simulation may take into account a deviation of a predictive performance quantified by the corresponding first performance signal from a predictive performance quantified by a previously generated first performance signal. In this way, a current predictive performance can be assessed relative to a previous predictive performance.

In particular, an upper performance threshold may be determined for a predictive performance quantified by the corresponding first performance signal and a corresponding predictive uncertainty. Similarly, a lower performance threshold may be determined for a predictive performance quantified by a previously generated first performance signal and a corresponding predictive uncertainty. Then, for the decision whether to run or to skip the respective simulation, the upper performance threshold may be compared with the lower performance threshold. It appears plausible that a current design variant having an upper performance threshold which is below a lower performance threshold of a previous design variant, may be neglected in the performance optimization process. Accordingly, a simulation can be skipped.

Furthermore, the upper performance threshold may be ranked within one or more lower performance thresholds determined for one or more previously generated first performance signals. Then, for the decision whether to run or to skip the respective simulation the rank may be taken into account. In particular, a quantile of the ranked performance thresholds may be specified. If the rank of the upper performance threshold is above the given quantile, the simulation may be run, otherwise skipped.

BRIEF DESCRIPTION

Some of the embodiments will be described in detail, with reference to the following figures, wherein like designations denote like members, wherein.

In the figures, common reference signs denote the same or corresponding entities, which are embodied as described at the respective place.

DETAILED DESCRIPTION

Figure 1:
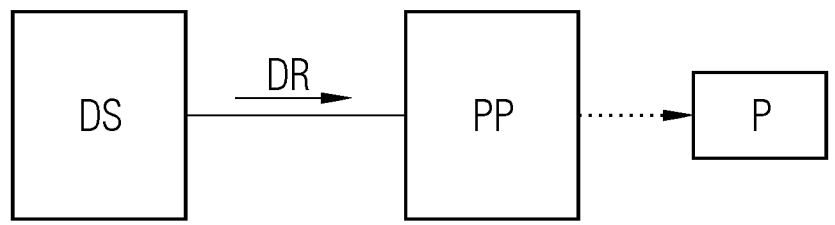
FIG. 1 shows a design system controlling a production plant to manufacture a product.

FIG. 1 shows in schematic representation, a design system DS coupled to a production plant PP and controlling the production plant PP to manufacture a product P. The production plant PP may be or comprise a manufacturing plant, a robot, a machining tool, and/or other devices for manufacturing or machining products by means of design data. The products to be manufactured may be robots, motors, turbines, turbine blades, combustion engines, machining tools, vehicles, or components thereof.

A design or design variant of the product P to be manufactured is specified by design data in the form of design data records DR. In particular, the design data records DR may specify a geometry, a structure, a property, a production step, a material, a component, and/or a part of the product P.

According to embodiments of the invention, the design system DS should be enabled to automatically generate design data records DR which are optimized with regard to one or more given performance criteria for the product P. In that respect, the terms optimization or optimizing should also comprise the meaning of getting closer to an optimum. Such performance criteria may pertain to a power, a yield, a speed, a running time, a precision, an error rate, a tendency to oscillate, a resource consumption, an aerodynamic efficiency, an energy efficiency, a pollutant emission, a stability, a wear, a lifetime and/or other design objectives or design constraints of the product P.

The design system DS generates such performance-optimizing design data records DR and transmits them to the production plant PP. By means of the performance-optimizing design data records DR, the production plant PP is controlled to manufacture the performance-optimized product P as specified by that performance-optimizing design data records DR. For manufacturing products specified by design data, many efficient computer-operated manufacturing tools are available.

Figure 2:
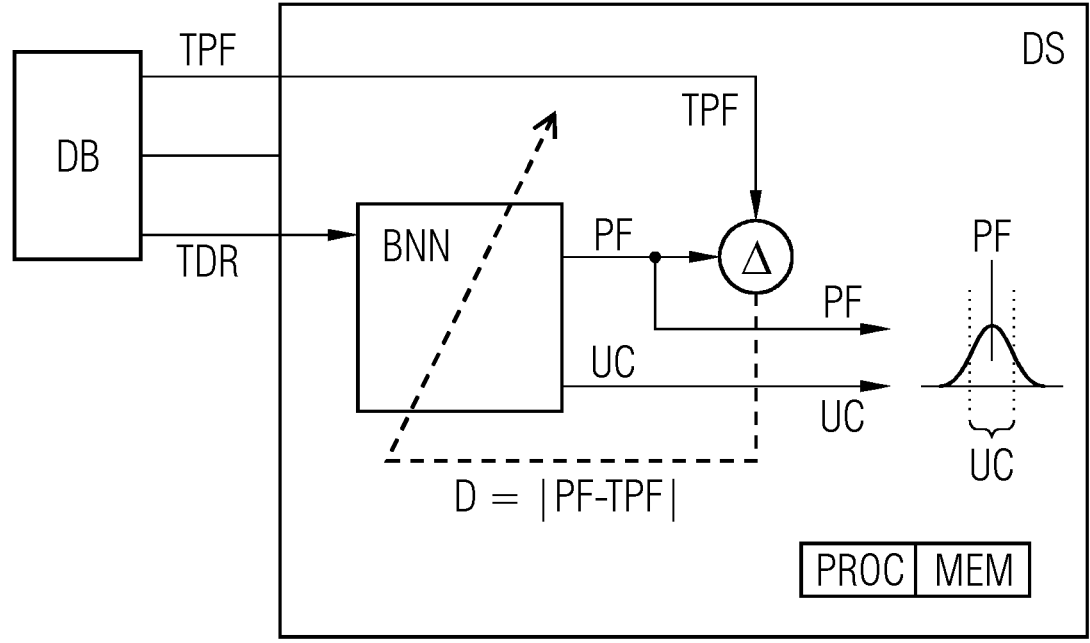
FIG. 2 shows an inventive design system in a training phase.

FIG. 2 illustrates an inventive design system DS in a training phase. The design system DS comprises one or more processors PROC for performing the method steps of embodiments of the invention and one or more data storages MEM for storing related data.

The design system DS is coupled to a database DB and further comprises a machine learning module BNN, which is implemented as Bayesian neural network. Such a Bayesian neural network can be considered as a statistical estimator. The latter serves the purpose of determining statistical estimation values for e.g. a mean, a variance, a standard deviation, and/or a probability distribution, from empirical data of a sample of a statistical population. A Bayes estimator may particularly optimize a posterior expected value of a loss function, cost function, reward function, or utility function.

By means of known machine learning methods and using sample data from a statistical population, a Bayesian neural network, here BNN, can be trained to estimate a probability distribution for a given new data record of that statistical population. Additionally, or alternatively to the Bayesian neural network, the machine learning module BNN may comprise or implement a Gaussian process model, which can also be trained to estimate a probability distribution for a given new data record of a statistical population.

A probability distribution may be represented by its mean, variance and/or standard deviation. In this case, a variance or standard deviation may be regarded as uncertainty of the mean value. Additionally or alternatively, an uncertainty of a probability distribution may be specified by an error interval, a confidence interval, or other measures of a width of that probability distribution. In that sense, a Bayesian neural network and a Gaussian process model can be regarded as uncertainty-aware machine learning models.

Some pertinent machine learning methods for training uncertainty-aware machine learning models are e.g. described in "Pattern Recognition and Machine Learning" by Christopher M. Bishop, Springer 2011.

According to the present embodiment, the Bayesian neural network BNN should be trained to generate from a design data record specifying a design variant of the product P, a first performance signal quantifying a predictive, i.e. expected performance of that design variant, together with a predictive uncertainty of that predictive performance.

Here, the term training generally means that a mapping from input data of a machine learning module to output data of that machine learning module is optimized with regard to predetermined and/or learned criteria during a training phase. In the present case, the criteria comprise to estimate a performance of a design variant together with an uncertainty of the estimation as precisely as possible. The mapping can be optimized by tuning mapping parameters of the machine learning module. In case of artificial neural networks, a connective structure of its neurons and/or weights of connections between the neurons may be varied in order to optimize the mapping. For such optimizations a multitude of numerical standard methods, like e.g. gradient descent methods, particle swarm methods, or genetic algorithms are available.

For training the Bayesian neural network BNN, a large amount of training data stored in the database DB are fed into the design system DS. The training data comprise many training design data records TDR, each specifying a design variant of a product. Assigned to a respective training design data record TDR, the training data further comprise a respective training performance value TPF. The latter quantifies an actual performance of the design variant specified by the corresponding training design data record TDR. As already indicated above, the performance may pertain to a power, a yield, a speed, a running time, a precision, an error rate, a tendency to oscillate, a resource consumption, an aerodynamic efficiency, an energy efficiency, a pollutant emission, a stability, a wear, a lifetime and/or other design objectives or design constraints of a product.

The training design data records TDR are input to the Bayesian neural network BNN as input data. From a respective training design data record TDR, the Bayesian neural network BNN generates an output signal PF, which is desired to quantify a performance of the design variant specified by the respective training design data record TDR. Furthermore, the Bayesian neural network BNN outputs an uncertainty UC of that output signal PF. The respective output signal PF is compared with the training performance value TPF corresponding to the respective training design data record TDR. Then, a deviation D of the training performance value TPF from the performance quantified by the output signal PF is fed back to the Bayesian neural network BNN as indicated by a dashed arrow in FIG. 2. With that, the Bayesian neural network BNN is trained to minimize the deviations D and to output uncertainties UC which reflect the actual statistics of the training data.

After the training, the Bayesian neural network BNN can be used as statistical estimator. The trained Bayesian neural network BNN is particularly enabled to generate from a design data record specifying a design variant of a product, an output signal PF which quantifies a predicted performance of that design variant and, therefore, can be used as first performance signal for that design data record. Moreover, a predicted uncertainty UC of the predicted performance is generated in parallel to the first performance signal PF.

Figure 3:
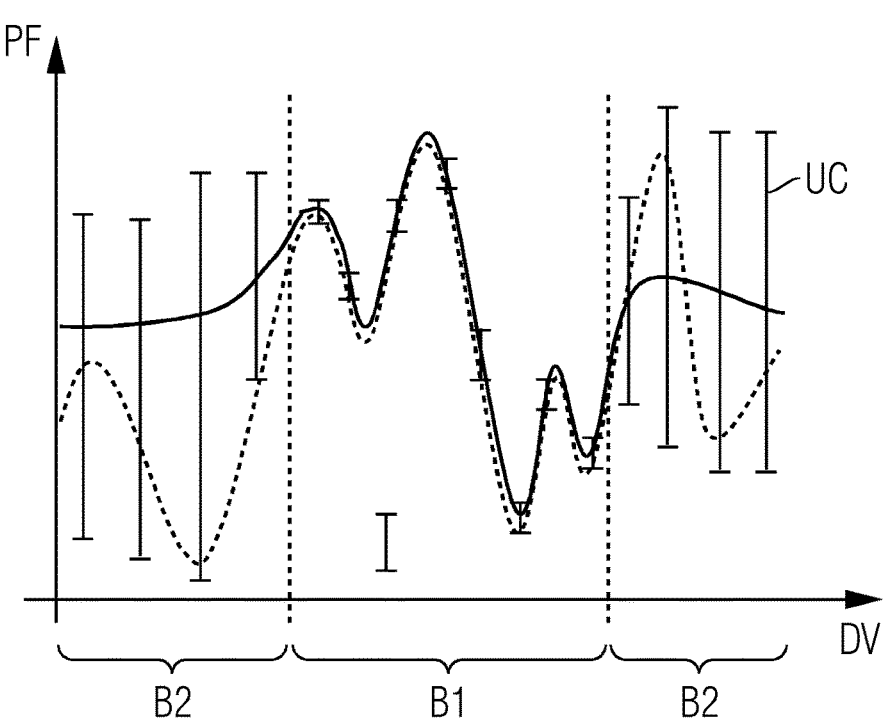
FIG. 3 shows data driven predictions and their predictive uncertainties.

FIG. 3 shows a diagram where a predicted performance as quantified by the first performance signal PF and the predictive uncertainty UC of that performance are schematically plotted against a variety of design variants DV. The predicted performance is plotted as a solid line with the corresponding uncertainties UC being visualized by error bars. For the sake of clarity, only one of the error bars is designated by the reference sign UC. Furthermore, an actual performance of the design variants DV is plotted as a dashed line.

The design variants DV are grouped into a design range B1 and in design ranges B2. It is assumed that the Bayesian neural network BNN was mainly trained by training data covering the design range B1 while the design ranges B2 were only poorly covered by the training data. Hence, it can be expected that the performance predictions of the Bayesian neural network BNN are more accurate and/or less uncertain in the design range B1 than in the design ranges B2. This behavior is also reflected in FIG. 3. This figure also shows that the actual performance lies within the uncertainties UC generated by the Bayesian neural network BNN. This is due to the intrinsic capability of Bayesian neural networks to automatically estimate realistic uncertainties of its predictions. Actually, the estimated uncertainties are usually higher in regions which are poorly covered by training data and/or which comprise much stochastic data.

Therefore, the first performance signal PF and the corresponding uncertainty UC as output by the trained Bayesian neural network BNN allow to indicate probable limits or thresholds for an actual performance of a design variant even in design regions which do not allow accurate predictions.

Figure 4:
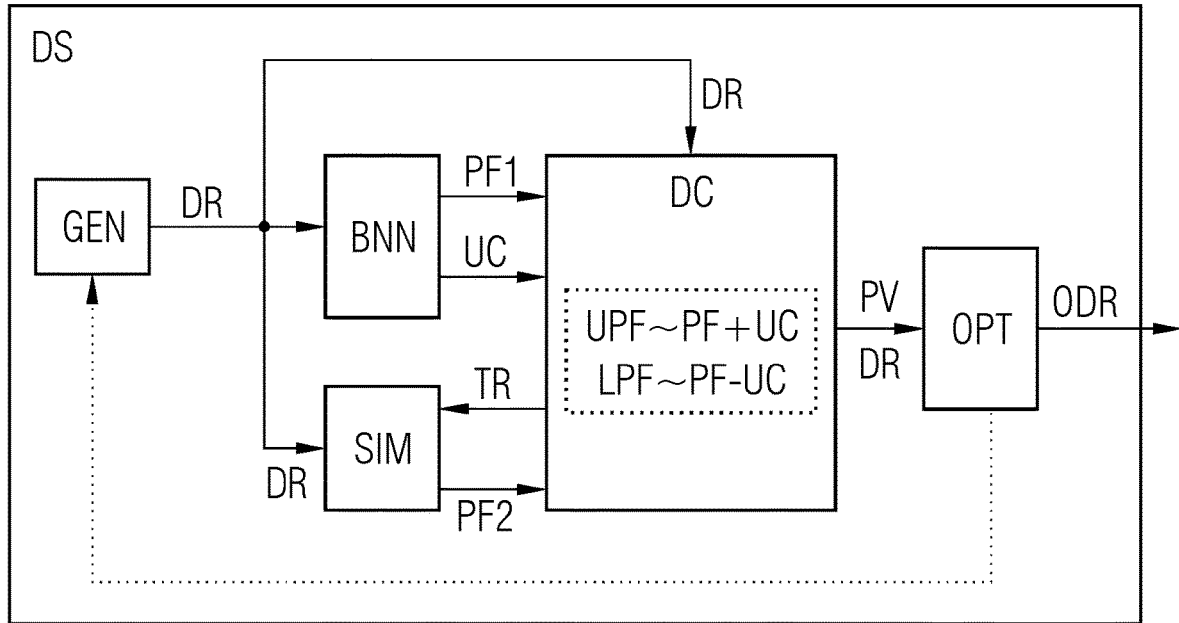
FIG. 4 shows an optimization of a product design by an inventive design system.

FIG. 4 illustrates an optimization of a design of the product P by the design system DS. The latter comprises the Bayesian neural network BNN, which was trained as described above.

The design system DS further comprises a design generator GEN for generating synthetic design data records DR each specifying a design variant of the product P.

From the design generator GEN the generated design data records DR are fed into the trained Bayesian neural network BNN as input data. From a respective design data record DR, the trained Bayesian neural network BNN generates a first performance signal PF1 quantifying a predictive performance of the corresponding design variant, and in parallel, a predictive uncertainty UC of that predictive performance.

The first performance signal PF1 and the uncertainty UC as well as the respective synthetic design data record DR are fed into a decision module DC of the design system DS. The decision module DC decides whether to run or to skip a simulation of the respective design variant in dependance of the corresponding uncertainty UC.

For performing such a simulation, the design system DS comprises a simulator SIM, which also receives the synthetic design data records DR from the design generator GEN. The simulator SIM is enabled to carry out a physical simulation of a design variant on the basis of a corresponding design data record DR. For such physical simulations many efficient methods, e.g. finite element methods, are known.

In the present case, the simulator SIM particularly determines a simulated performance of a respective simulated design variant. Usually a performance can be determined quite accurately by simulation. However, such accurate physical simulations often require considerable computation resources. Hence, it appears advantageous to skip expensive simulations if the performance can be reliably determined otherwise.

According to embodiments of the present invention, the uncertainties UC of the first performance signals PF1 as predicted by the trained Bayesian neural network BNN are used to decide whether a simulation is run or skipped. If a predictive uncertainty UC is low, the corresponding performance predicted by the trained Bayesian neural network BNN may be accurate enough, so the simulation may be skipped. If a predictive uncertainty UC is high, on the other hand, the corresponding predictive performance may be not reliable enough. In that case a simulation may be run to yield a more accurate performance prediction.

In order to decide on the simulation, the decision module DC also takes the first performance signals PF1 into account. In particular, the decision module DC uses a current first performance signal PF1 together with one or more previously generated first performance signals. From the current first performance signal PF1 an upper performance threshold UPF is calculated. The upper performance threshold UPF should be greater than the actual performance with a predetermined probability of e.g. 95%. Such an upper limit can be easily derived by means of the corresponding uncertainty UC. In the simplest cases the uncertainty UC, possibly multiplied with a given factor is added to the corresponding performance to yield a likely upper performance threshold UPF. Analogous to that, lower performance thresholds LPF are calculated from previously generated first performance signals and their corresponding uncertainties. In particular, a respective lower performance threshold LPF may be chosen as the lower bound of an e.g. 95% credible interval for a respective performance. In the simplest cases a respective uncertainty, possibly multiplied with a given factor is subtracted from a corresponding performance to yield a likely lower performance threshold LPF.

According to the present embodiment, the upper performance threshold UPF is then ranked within the lower performance thresholds LPF. For that purpose, the performance thresholds UPF and LPF may be sorted. If the rank of the upper performance threshold UPF is higher than a given quantile of e.g. 75% of the whole ranking, then the decision module DC decides to run a simulation. Otherwise, the decision module DC decides to skip the simulation. If a performance of a current design variant is very likely lower than a performance of 25% of previously generated design variants, then the current design variant may be neglected in the performance optimization process.

If the decision module DC decides to run a simulation the decision module DC transmits a trigger signal TR to the simulator SIM. The trigger signal TR causes the simulator SIM to simulate the design variant specified by the respective design data record DR. As a result of the simulation, the simulator SIM generates a second performance signal PF2 quantifying a simulated performance of that design variant. The second performance signal PF2 is then transmitted from the simulator SIM to the decision module DC.

If the simulation is run, the decision module DC selects the simulated performance quantified by the second performance signal PF2 as performance value PV for the respective design variant. If, otherwise, the simulation is skipped, the decision module DC selects the predictive performance quantified by the first performance signal PF1 as performance value PV for the respective design variant. The resulting performance value PV is allocated to the corresponding design data record DR.

The respective design data record DR and the corresponding performance value PV are transmitted from the decision module DC to an optimization module OPT of the design system DS. Depending on the received performance values PV, the optimization module OPT selects one or more of the design data records DR with a highest or with a particular high performance value PV. From the one or more selected design data records DR, the optimization module OPT takes or interpolates a performance-optimizing design data record ODR. The performance-optimizing design data record ODR is then output in order to control the production plant PP as described above.

According to an advantageous implementation, the optimization module OPT may influence the design generator GEN to drive the generation of the design data records DR in the direction of design variants with higher performance. This influence is indicated by a dotted arrow in FIG. 4.

Moreover, the second performance signals PF2 may be used to continue a training of the Bayesian neural network BNN. As the simulation results are usually quite accurate, the training status of the Bayesian neural network BNN may be improved in this way.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for controlling a production plant to manufacture a product, the method comprising:
   a) providing a machine learning module which is trained to generate from a design data record specifying a design variant of the product:
      a first performance signal quantifying a predictive performance of the design variant, and
      a predictive uncertainty of the predictive performance;
   b) generating a variety of design data records each specifying the design variant of the product;
   c) for a respective design data record:
      generating the first performance signal and a corresponding predictive uncertainty by the machine learning module,
      depending on the predictive uncertainty being below a threshold value, skipping the simulation of the corresponding design variant, and depending on the predictive uncertainty exceeding the threshold value, running the simulation of the corresponding design variant, the simulation yielding a second performance signal quantifying a simulated performance of that design variant, and
      deriving a performance value from the second performance signal if the simulation is run or, otherwise, from the first performance signal;
   d) depending on the derived performance values, determining from the variety of design data records a performance-optimizing design data record; and
   e) outputting the performance-optimizing design data record for controlling the production plant.

2. The method according to claim 1, wherein the machine learning module comprises or implements a surrogate model, a Bayesian machine learning model, a Bayesian neural network and/or a Gaussian process model.

3. The method according to claim 1, wherein the training of the machine learning module is continued by using the second performance signals as training data.

4. The method according to claim 1, wherein the predictive and/or simulated performance of a design variant depends on a fulfillment of one or more design objectives by the design variant and/or on a compliance of the design variant with one or more design constraints.

5. The method according to claim 1, wherein the predictive uncertainty is represented by a probability distribution, a discrete probability distribution, a statistical variance, a statistical standard deviation, a confidence interval, and/or an error interval.

6. The method according to claim 1, wherein for a decision whether to run or to skip a respective simulation, the corresponding first performance signal is taken into account.

7. The method according to claim 1, wherein for a decision whether to run or to skip a respective simulation, a deviation of a predictive performance quantified by the corresponding first performance signal from a predictive performance quantified by a previously generated first performance signal is taken into account.

8. The method according to claim 6, wherein an upper performance threshold is determined for a predictive performance quantified by the corresponding first performance signal and a corresponding predictive uncertainty, a lower performance threshold is determined for a predictive performance quantified by a previously generated first performance signal and a corresponding predictive uncertainty, and for the decision whether to run or to skip the respective simulation the upper performance threshold is compared with the lower performance threshold.

9. The method according to claim 8, wherein the upper performance threshold is ranked within one or more lower performance thresholds determined for one or more previously generated first performance signals, and for the decision whether to run or to skip the respective simulation the rank is taken into account.

10. A system for controlling a production plant to manufacture a product performing the method according to claim 1.

11. A computer program product, comprising a computer readable hardware storage device having computer readable program code stored therein, said program code executable by a processor of a computer system to implement a method according to claim 1.

12. The method according to claim 1, further comprising: controlling the production plant using the performance-optimizing design data record to manufacture the product as specified by the performance-optimizing design data record.

* * * * *